July 10, 1962
C. W. LANG ET AL
VARIABLY COUPLED ROTARY TRANSFORMER
WITH COMPENSATING CIRCUITS
Filed Aug. 10, 1959
3,044,009
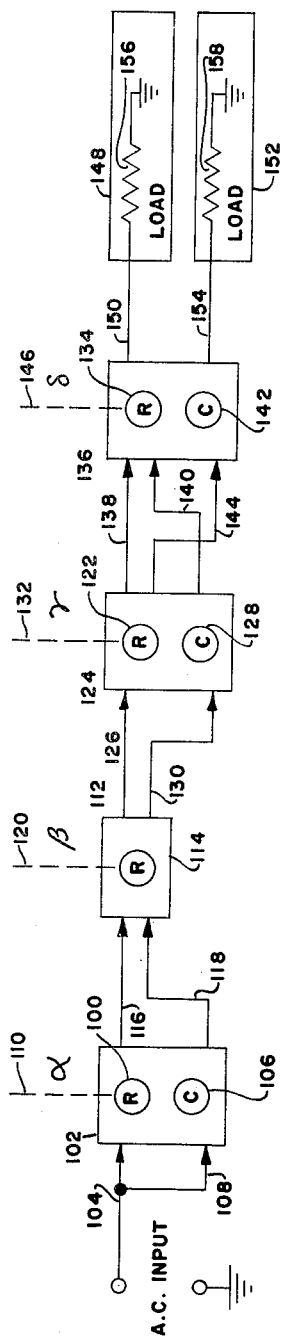
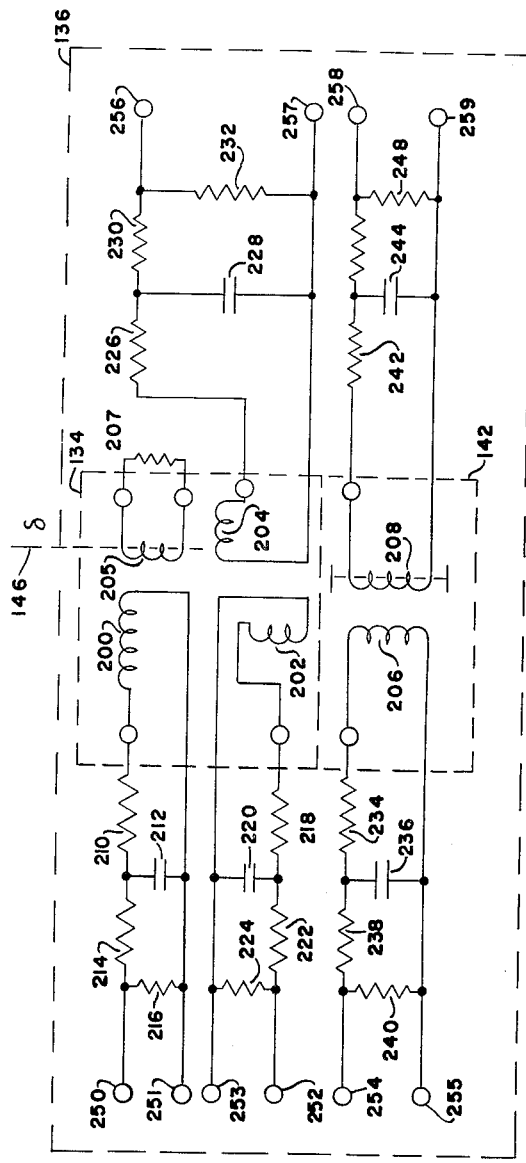
VINCENT V. ROBERTI
CHARLES W. LANG
*INVENTORS*
BY Andrew L. Bain
George J. Seligsohn
ATTORNEYS

United States Patent Office 3,044,009
Patented July 10, 1962

3,044,009
VARIABLY COUPLED ROTARY TRANSFORMER WITH COMPENSATING CIRCUITS
Charles W. Lang, Pompton Plains, N.J., and Vincent V. Roberti, Norristown, Pa., assignors to General Precision, Inc., a corporation of Delaware
Filed Aug. 10, 1959, Ser. No. 832,633
11 Claims. (Cl. 323—53)

This invention relates to resolvers for use in analog computers and, more particularly, to electrical compensation means for such resolvers.

As well known in the art, analog computers may be used in such applications as coordinate converters for automatically solving complex trigonometric functions of a plurality of angles. Often such analog computers utilize one or more chains of resolvers, each resolver of a chain being associated with a different angle.

A resolver, which is well known in the art, comprises a stator having either a single inductive winding or two inductive windings oriented at right angles to each other, and a rotor having either a single inductive winding or two inductive windings oriented at right angles to each other. Either the stator windings are energized by A.C. input signals of given frequency and phase, and induced output signals are obtained from the rotor windings, or the rotor windings are energized by the A.C. input signals and the induced output signals are obtained from the stator windings. In any case, the amplitude of an induced output signal depends upon the amplitudes of the input signals and the angular orientation of the rotor with respect to the stator.

It will be seen that a resolver is essentially a rotary transformer in which the coupling between the primary and secondary is varied in accordance with the angular orientation of the rotor with respect to the stator.

In a hypothetical ideal resolver having stator and rotor windings with the same number of turns, the transformation ratio is unity, i.e., if a rotor winding and a stator winding are oriented in parallel relationship, the amplitude of the output induced in one of the windings in response to an input energization signal applied to the other of the windings will be exactly equal to the amplitude of the applied input energization signal. Furthermore, regardless of the orientation of the rotor with respect to the stator, the phase of the induced A.C. output voltage in an ideal resolver would be identical to that of the input energization signal. In addition, in the ideal resolver, neither the input energization signal nor the induced output signal would be affected by the value of the effective input or output impedance of the resolver.

Although practical resolvers are precision elements, they are still far from being ideal. Thus, in practical resolvers, the transformation ratio with rotor and stator windings having the same number of turns is substantially below unity; a relative phase shift exists between the applied input A.C. energization signal and the induced ouput signal; and the input energization signal and the induced output signal are effected by the values of the effective input and output impedances of the resolver, which are subject to loading effects.

Furthermore, the respective magnitudes of transformation ratio, relative phase shift, and input and output impedance are not constant, but vary from resolver to resolver due to manufacturing tolerances, and vary within any single resolver with changes in temperature.

In an analog computer, which incorporates a chain of resolvers, the variation in the transformation ratio, relative phase shift, and input and output impedance may cause a cumulative error which is sufficient to destroy the accuracy and reliability of the analog computer.

In the past, in order to minimize this error, it has been the practice to insert buffer amplifiers between resolvers of the chain to effect isolation of the resolvers. The gain and phase shift provided by these amplifiers is carefully adjusted to compensate for the variations in transformation ratio and relative phase shift of the resolvers.

However, the introduction of such buffer amplifiers is of doubtful value, since they greatly increase the complexity of the resolver chain. By greatly increasing the complexity of the resolver chain, the room for error is also increased greatly.

It is therefore, an object of the present invention to provide improved means for compensating for error in a resolver chain.

It is further object of this invention to provide simple means for compensating for variation in the transformation ratio, relative phase shift, and/or input and output impedances between the resolvers of a chain of resolvers.

It is a still further object of this invention to provide simple means for compensating for variations in the transformation ratio, relative phase shift, and/or input and output impedances of a resolver due to temperature changes.

One feature of the present invention is the use of iterative tuning networks to reduce the variations in the transformation ratio, relative phase shift, and/or input and output impedances, due to manufacturing tolerances, to negligible proportions.

Another feature of the present invention is the use of a novel compensator which is oriented in proximity to a resolver. Briefly, this compensator is physically identical to its associated resolver except that the compensator has a single stator winding and a single rotor winding which is permanently oriented in a position relative to the stator winding to provide maximum coupling therebetween. Since the compensator is physically identical to its associated resolver and is in proximity thereto, it will always be at substantially the same temperature as its associated resolver and react in a substantially identical manner to temperature changes.

These and other attendant objects, features and advantages of the present invention will be better understood from the following detailed description taken together with the accompanying drawing, in which:

FIGURE 1 is a block diagram of an illustrative chain of resolvers incorporating the compensators of the present invention, and FIGURE 2 is a schematic circuit of an illustrative resolver and its associated compensator showing the iterative tuning networks incorporated therein.

Referring now to FIGURE 1, there is shown a resolver chain for producing two outputs, each of which has a magnitude proportional to the predetermined trigonometric function of some or all of angles $\alpha$, $\beta$, $\gamma$ and $\delta$. The number of resolvers in the chain and the manner in which the resolvers are coupled to each other depend solely on the particular predetermined functions to be derived. Thus, the particular resolver chain shown in FIGURE 1 is merely an illustrative example of one of the myriad of possible resolver chains.

In the following discussion it will be assumed that the inputs to each resolver and compensator are applied to a stator winding thereof and the output from each resolver is obtained from a rotor winding thereof. However, it would make no difference in the operation of the resolver chain if the inputs to the respective resolvers and compensators had been assumed to be applied to the rotor windings thereof and the outputs to be obtained from the stator windings thereof.

As shown in FIGURE 1, an A.C. input signal of a predetermined frequency and phase is applied to a stator winding of resolver 100 of resolver-compensator unit 102 over conductor 104 and is applied to compensator 106 of resolver-compensator unit 102 over conductor 108.

The A.C. input signal may have a predetermined constant amplitude or it may have an amplitude which is proportional to some external variable.

Resolver 100 includes a rotor which is rotated from a reference position through a variable angle α by shaft 110. Resolver 100 further includes a rotor winding which is oriented to provide maximum coupling with the stator winding thereof when the rotor is in its reference position.

The physical characteristics of compensator 106, such as size, spacing, arrangement of component parts, etc., are identical with those of resolver 100. However, the rotor of compensator 106 is permanently fixed in position with the rotor winding thereof oriented to provide maximum coupling with a stator winding thereof.

The output from the rotor winding of resolver 100 is applied as an input to a first stator winding of resolver 112 of resolver unit 114 over conductor 116. The output from the rotor winding of compensator 106 is applied as an input to a second stator winding of resolver 112, which is oriented perpendicular to the first winding thereof, over conductor 118.

Resolver 112 includes a rotor which is rotated from a reference position through a variable angle β by shaft 120. Resolver 112 further includes a first rotor winding which is oriented to provide minimum coupling with the first stator winding thereof and maximum coupling with the second stator winding thereof when the rotor is oriented in its reference position. Resolver 112 also includes a second rotor winding, which is perpendicular to the first rotor winding thereof, so that maximum coupling between the second rotor winding and the first stator winding and minimum coupling between the second rotor winding and the second stator winding is provided when the rotor of resolver 112 is in its reference position.

The output from the first rotor winding of resolver 112 is applied as an input to a stator winding of resolver 122 of resolver-compensator unit 124 over conductor 126. The output from the second rotor winding of resolver 112 is applied as an input to compensator 128 of resolver-compensator unit 124 over conductor 130.

Resolver 122 includes a rotor which is rotated from a reference position through a variable angle γ by shaft 132. Resolver 122 further includes a first rotor winding which is oriented to provide minimum coupling with the stator winding thereof when the rotor is oriented in its reference position. Resolver 122 also includes a second rotor winding, which is perpendicular to the first rotor winding, so that maximum coupling between the second rotor winding and stator winding of resolver 122 is provided when the rotor is in its reference position.

The physical characteristics of compensator 128, such as size, spacing, arrangement of component parts, etc., are identical with those of resolver 122. However, the rotor of compensator 128, which may only include a single rotor winding, is permanently fixed in position with the rotor winding thereof oriented to provide maximum coupling with a stator winding thereof.

The output from the first rotor winding of resolver 122 is applied as an input to a first stator winding of resolver 134 of resolver-compensator unit 136 over conductor 138. The output from the rotor winding of compensator 128 is applied as an input to a second stator winding of resolver 134, which is perpendicular to the first stator winding thereof, over conductor 140. The output from the second rotor winding of resolver 122 is applied as an input to the stator winding of compensator 142 of resolver-compensator unit 136 over conductor 144.

Resolver 134 includes a rotor which is rotated from a reference position through a variable angle δ by shaft 146. Resolver 134 further includes a rotor winding which is oriented to provide maximum coupling with the first stator winding thereof and minimum coupling with the second stator winding thereof when the rotor thereof is in its reference position.

The physical characteristics of compensator 142, such as size, spacing, arrangement of component parts, etc., are identical with those of resolver 134. However, the rotor of compensator 142 is permanently fixed in position with the rotor winding thereof oriented to provide maximum coupling with a stator winding thereof.

The output from the rotor winding of resolver 134 is connected as an input to load 148 over conductor 150. The output from the rotor winding of compensator 142 is connected as an input to load 152 over conductor 154.

The effective input impedances 156 and 158, respectively, of loads 148 and 152, respectively, are preferably pure resistances of the same value.

Referring now to FIGURE 2, resolver-compensator unit 136 is shown schematically in detail.

As discussed above, resolver 134 of resolver-compensator unit 136 includes first stator winding 200, second stator winding 202, first rotor winding 204, second rotor winding 205, and shaft 146. Compensator 142 includes stator winding 206 and rotor winding 208.

Second rotor winding 205, which is provided merely to maintain balance, is terminated in resistance 207.

In addition to resolver 134 and compensator 142, resolver-compensator unit 136 includes a plurality of iterative tuning networks, each of which is associated with a separate one of the windings of resolver 134 and compensator 142.

Associated with first stator winding 200 of resolver 134 is an iterative tuning network composed of first series resistance 210, shunt capacitance 212, second series resistance 214 and shunt resistance 216. Associated with second stator winding 202 of resolver 134 is an iterative tuning network composed of first series resistance 218, shunt capacitance 220, second series resistance 222 and shunt resistance 224. Associated with first rotor winding 204 of resolver 134 is an iterative tuning network composed of first series resistance 226, shunt capacitance 228, second series resistance 230 and shunt resistance 232. Associated with stator winding 206 of compensator 142 is an iterative tuning network composed of first series resistance 234, shunt capacitance 236, second series resistance 238 and shunt resistance 240. Associated with rotor winding 208 of compensator 142 is an iterative tuning network composed of first series resistance 242, shunt capacitance 244, second series resistance 246 and shunt resistance 248. The term iterative is employed in the sense that the compensating tuning network associated with the input to resolver 134 stator winding 200, is repeated in the case of the input to the other resolver stator winding 202.

The input to the first stator winding of resolver 134 is applied to terminals 250 and 251. The input to the second stator winding of resolver 134 is applied to terminals 252 and 253. The input to the stator winding of compensator 142 is applied to terminals 254 and 255. The output from the first rotor winding of resolver 134 is obtained from terminals 256 and 257. The output from the rotor winding of compensator 142 is obtained from terminals 258 and 259.

In a similar manner, each of the stator and rotor windings of each of the resolvers and compensators of resolver-compensator units 102 and 124 and resolver unit 114, respectively, is supplied with a corresponding iterative tuning network composed of a first series resistance, a shunt capacitance, a second series resistance and a shunt resistance.

As was stated earlier, due to manufacturing tolerances and the fact that the resolvers and compensators are not ideal, the transformation ratios of resolvers and compensators, will vary from element to element. Similarly, there will be a relative phase shift between input and output which will vary from element to element. Also, the effective input and output impedance will vary from element to element.

It is the purpose of the respective iterative tuning networks to reduce these variations to negligible proportions. This is accomplished in the following manner:

Each resolver and compensator is individually tested, by connecting an A.C. input of known frequency and phase directly to each stator winding thereof and connecting a load resistance of a predetermined value across each rotor winding thereof, to determine the actual transformation ratio, relative phase shift and effective input impedance of that resolver or compensator in the forward direction. Then each resolver is again individually tested, this time by connecting the A.C. input directly to each motor winding thereof and connecting the load resistance of predetermined value across each stator winding thereof, to determine the actual transformation ratio, relative phase shift and effective output impedance in the reverse direction.

With information determined by these tests and similar retests, appropriate values for the first series resistances and shunt capacitance of each iterative tuning network are chosen and first adjusted to reduce the relative phase shift to substantially zero in both the forward and reverse directions. Then the value of the second series resistance is chosen and adjusted to lower the transformation ratio in both the forward and reverse directions to a predetermined value somewhat below the lowest value encountered within the manufacturing tolerance of a resolver or compensator. Lastly, the value of the shunt resistance of each iterative tuning network is chosen to make both the effective input and output impedances of each resolver-compensator unit or resolver unit, as the case may be, equal to a pure resistance of the predetermined value of the load resistance.

In order to properly select the components, the units are first operated at no load, at which the first series resistance and the shunt capacitance of each network are selected in such a manner as to obtain zero phase shift. After that, the second resister is selected to reduce the transformation ratio in one direction. After that, the unit is rechecked while rotated in the opposite direction.

The previously selected first series resistance, and the shunt capacitance of each network are adjusted to obtain substantially zero phase shift.

The previously selected second series resistances are adjusted in such a manner as to reduce the transformation ratio.

After this is accomplished, each unit is again rechecked when rotated in the initial direction to determine whether the derived values for the phase shift and transformation ratio are suitable.

The adjustment of both first and second series resistances and the shunt capacitance are continued until the required phase shift (substantially zero), and the required transformation ratio are obtained in both directions of rotation.

The combination of the two series resistances and the shunt capacitance provide a high enough degree of variables to allow both the phase shift and the transformation ratio to be adjusted to the required degree with the unit tested rotated in both directions.

If each resolver and each compensator is individually trimmed and adjusted to close enough tolerances, they can be utilized interchangeably instead of using them in selected pairs.

The compensator provides the adjustment of the angle function signal given out by the first resolver so that the combined signal from the first resolver and the compensator, transmitted to the second resolver is substantially equal to the initial angle function signal transmitted to the first resolver.

The compensator incorporates into the signal transmitted by the resolver with which it is paired, to the second resolver, the phase shift, and transformation ratio of the first resolver.

As the phase shift is reduced to substantially zero, it is necessary where this is done, to transmit only the transformation ratio to the second resolver.

This is the primary purpose of the compensator.

In one case in practice, for instance, where the manufacturing tolerance of the transformation ratio in resolvers or compensators was ±4%, by employing iterative tuning networks, the transformation ratio was made equal to 0.680±.001.

Where the manufacturing tolerance of the relative phase shift was ±1°, by employing iterative tuning networks, the relative phase shift was reduced to 0°±12 minutes. Where the manufacturing tolerance of the effective input and output impedances was ±10%, by employing iterative tuning networks the effective input and output impedances were made pure resistances which varied from a predetermined value by only ±¼%.

Referring now to the operation of the resolver chain shown in FIGURE 1, it will be seen that if load impedances 156 and 158 are both equal to the given impedance to which the iterative networks are tuned, the effective input impedances of resolver 134 and compensator 142 of resolver-compensator unit 136 will also be equal to the given impedance. Thus, in a similar manner it can be shown that the input impedance of all the resolver-compensator units and resolver units in the resolver chain are all equal to each other and equal to the given impedance.

Thus the resolver chain is balanced throughout, the cumulative relative phase shift is extremely low, and loading effects are negligible.

Since both the stator windings and the rotor windings are provided with iterative tuning networks, the resolver chain is bilaterally balanced i.e., it is balanced not only in the forward direction, but in the reverse direction. Thus an A.C. input signal may be applied to the rotor windings of resolver-compensator unit 136 and the output may be taken from the stator windings of resolver-compensator unit 102 when resolver 102 is terminated in the given impedance, and the resolver chain will still be balanced.

Very often it is only necessary that the resolver chain be balanced in the forward direction. In this case the iterative tuning networks connected to the output rotor windings of each resolver-compensator unit or resolver unit may be omitted, so that only the iterative tuning networks connected to the input stator windings of each resolver-compensator unit or resolver unit are employed.

Considering now the operation of the compensators, if the output applied from compensator 106 over conductor 118 to the second stator winding of resolver 112 is considered proportional to unity, then the output applied from resolver 100 over conductor 116 to the first stator winding of resolver 112 is proportional to cos $\alpha$. More specifically, the output applied from compensator 106 over conductor 118 is $kA$ and the output applied from resolver 100 over conductor 116 is $kA \cos \alpha$, where $k$ is the transformation ratio of either resolver 100 or compensator 106, including the iterative tuning networks thereof, and A is the amplitude of the A.C. input applied to resolver 100 over conductor 104 and to compensator 106 over conductor 108.

If compensator 106 were omitted, so that the A.C. input was applied directly to the second stator winding of resolver 112 over conductor 118, then the input to the second stator winding of resolver 112 would be equal to A, rather that $kA$, while the input to the first stator winding of resolver 112 would still be $kA \cos \alpha$. This would result in the input to resolver 112 being unbalanced. Thus, compensator 106 serves to maintain balance by introducing the transformation ratio $k$ as a factor.

The transformation ratio $k$ varies somewhat in value with changes in the temperature. However, since both resolver 100 and compensator 106 have the same physical characteristics, and are both located in proximity to each other in resolver-compensator unit 102, the variations in the transformation ratios $k$ of resolver 100 and compensator 106 will be substantially identical, so that balance at the input to resolver 112 will still be maintained.

Compensator 106, along with its iterative tuning networks, performs the further functions of maintaining the phase and input impedance of the inputs applied to resolver unit 114 over conductors 116 and 118 respectively, equal to each other.

Compensators 128 and 142, the other compensators in the resolver chain shown in FIGURE 1, in addition to performing the same functions as compensator 106 results in the preceding unit seeing a balanced load.

In general, therefore, a compensator is employed in association with a resolver chain wherever a term of a trigonometric function to be solved is not dependent upon the angle with which that resolver is associated. Thus, where all terms of the trigonometric function to be solved are dependent upon a particular angle, such as angle $\beta$ in the resolver-chain shown in FIGURE 1, it is not necessary to provide an associated compensator to maintain balance. For this reason, resolver 112 has no compensator in association therewith.

Although the description of the invention has been limited to rotary transformers of the resolver type, the principles of the present invention may be employed with equal effect with rotary transformers of any other type, such as synchros, etc.

Although only one embodiment of the invention has been described in detail herein, it is not intended that the invention be restricted thereto, but that it be limited only by the true spirit and scope of the appended claims.

We claim:

1. A combination comprising a rotary transformer having at least one rotor winding and one stator winding, and a network of circuit elements having one end thereof connected to one of said windings, the respective values of said circuit elements being chosen to provide a predetermined transformation ratio between an A.C. input voltage connected to the other end of said network and the maximum output voltage derived from the other of said windings, a substantially zero phase shift between said A.C. input voltage and said output voltage, and an input impedance of a predetermined value at the other end of said network, when a load impedance of said predetermined value is connected to the other of said windings, a compensator electrically connected to the rotary transformer, said compensator having the same physical characteristics as said rotary transformer, the angle signal transmitted to the compensator being substantially the same as that transmitted to the rotary transformer, and a second rotary transformer electrically connected to the first rotary ransformer and the compensator, the first rotary transformer and the compensator being adapted to transmit individual electrical signals to the second rotary transformer, the compensator incorporating into the signal transmitted by the first rotary transformer to the second rotary transformer, the transformation ratio and phase shift of the first rotary transformer, as a means of correcting the signal transmitted by the first rotary transformer to the second rotary transformer.

2. The combination defined in claim 1, wherein said load impedance is solely resistive, whereby said input impedance is also solely resistive and has a predetermined value of resistance equal to that of said load impedance.

3. The combination defined in claim 2, wherein said network includes a first series resistance and shunt capacitance the values of which are chosen to provide substantially zero phase shift, a second series resistance the value of which is chosen to provide said predetermined transformation ratio, and a shunt resistance the value of which is chosen to provide said predetermined value of input impedance.

4. A combination comprising a first rotary transformer having at least one rotor winding and one stator winding, a first network of circuit elements having one end thereof connected to one of said windings, and a second network of circuit elements having one end thereof connected to the other of said windings, the respective value of said circuit elements being chosen to provide a predetermined transformation ratio between an A.C. input voltage connected to the other end of one of said first and second networks and the maximum output voltage derived from the other end of the other one of said first and second networks, a substantially zero phase shift between said A.C. input voltage and said output voltage, and an input impedance of a predetermined value at the other end of said one of said first and second networks, when a load impedance of said predetermined value is connected to the other end of said other one of said first and second networks, said networks including a compensator incorporated with said first rotary transformer, an angle signal transmitted to the first rotary transformer, an angle signal transmitted to the compensator, said angle signal being substantially the same as that transmitted to the first rotary transformer, and a second rotary transformer electrically connected to the first rotary transformer and the compensator, the first rotary transformer and the compensator being adapted to transmit individual electrical signals to the second rotary transformer, the compensator incorporating into the signal transmitted to the second rotary transformer, the transformation ratio and phase shift of the first rotary transformer, as a means of correcting the signal transmitted by the first rotary transformer to the second rotary transformer.

5. A combination comprising a first rotary transformer having at least one rotor winding and one stator winding and a network of circuit elements having one end thereof connected to one of said windings, the respective values of said circuit elements being chosen to provide an input impedance of a predetermined value at the other end of said network when a load impedance of the same predetermined value is connected to the other of said windings, said load impedance being solely resistive, said input impedance also being solely resistive and having a predetermined value of resistance equal to that of said load impedance, and a compensator incorporated with said first rotary transformer, an angle signal transmitted to the first rotary transformer, an angle signal substantially equal to that transmitted to the first rotary transformer, transmited to he compensaor, and a second rotary transformer electrically connected to the first rotary transformer and the compensator, the first rotary transformer and the compensator being adapted to transmit individual electrical signals to the second rotary transformer, the compensator incorporating into the signal transmitted to the second rotary transformer, the transformation ratio and phase shift of the first rotary transformer, as a means of correcting the signal transmitted by the first rotary transformer to the second rotary transformer.

6. A rotary transformer-compensator unit adapted for use in a chain of units, said rotary transformer-compensator unit comprising a first rotary transformer including at least one rotor winding, at least one stator winding, and means for rotating said rotor winding through an angle with respect to said stator winding, said first rotary transformer having given physical characteristics, and a compensator incorporated with said first rotary transformer, an angle signal transmitted to the first rotary transformer, an angle signal substantially equal to that transmitted to the first rotary transformer transmitted to the compensator, said compensator including a rotor winding and a stator winding, said rotor winding of said compensator being permanently oriented relative to said stator winding thereof to provide maximum coupling therebetween, said compensator having the same given physical characteristics as said first rotary transformer, and a second rotary transformer electrically connected to the first rotary transformer and the compensator, the first rotary transformer and the compensator being adapted to transmit individual electrical signals to the second rotary transformer, the compensator incorporating into the signal transmitted by the first rotary transformer to the second rotary transformer, the transformation ratio and phase shift of the first rotary transformer, as a means of correcting the signal transmitted by the first rotary transformer to the second rotary transformer.

7. A rotary transformer-compensator unit adapted for use in a chain of units, said rotary transformer-compensator unit comprising a first rotary transformer including at least one rotor winding, at least one stator winding, and means for rotating said rotor winding through an angle with respect to said stator winding, said first rotary transformer having given physical characteristics, and a compensator incorporated with the first rotary transformer, said compensator including a rotor winding and a stator winding, said rotor winding of said compensator being permanently oriented relative to said stator winding thereof to provide maximum coupling therebetween, said compensator having the same given physical characteristics as said first rotary transformer, and a second rotary transformer electrically connected to the first rotary transformer and the compensator, the first rotary transformer and the compensator being adapted to transmit individual electrical signals to the second rotary transformer, the compensator incorporating into the signal transmitted by the first rotary transformer to the second rotary transformer, the transformation ratio and phase shift of the first rotary transformer, as a means of correcting the signal transmitted by the first rotary transformer to the second rotary transformer, said compensator being in close proximity to said first rotary transformer.

8. A rotary transformer-compensator unit adapted for use in a chain of units, said rotary transformer-compensator unit comprising a first rotary transformer including at least one rotor winding, at least one stator winding, and means for rotating said rotor winding through an angle with respect to said stator winding, said first rotary transformer having given physical characteristics, and a compensator incorporated with the first rotary transformer, said compensator including a rotor winding and a stator winding, said rotor winding of said compensator being permanently oriented relative to said stator winding thereof to provide maximum coupling therebetween, said compensator having the same given physical characteristics as said first rotary transformer, and a second rotary transformer electrically connected to the first rotary transformer and the compensator, the first rotary transformer and the compensator being adapted to transmit individual electrical signals to the second rotary transformer, the compensator incorporating into the signal transmitted by the first rotary ransformer to the second rotary transformer, the transformation ratio and phase shift of the first rotary transformer, as a means of correcting the signal transmitted by the first rotary transformer to the second rotary transformer, said first and second rotary transformers being resolvers.

9. A rotary transformer-compensator unit adapted for use in a chain of units, said rotary transformer-compensator unit comprising a first rotary transformer including at least one rotor winding, at least one stator winding, and means for rotating said rotor winding through an angle with respect to said stator winding, said first rotary transformer having given physical characteristics, and a compensator incorporated with the first rotary transformer, said compensator including a rotor winding and a stator winding, said rotor winding of said compensator being permanently oriented relative to said stator winding thereof to provide maximum coupling therebetween, said compensator having the same given physical characteristics as said first rotary transformer, and a second rotary transformer electrically connected to the first rotary transformer and the compensator, the first rotary transformer and the compensator being adapted to transmit individual electrical signals to the second rotary transformer, the compensator incorporating into the signal transmitted by the first rotary transformer to the second rotary transformer, the transformation ratio and phase shift of the first rotary transformer, as a means of correcting the signal transmitted by the first rotary transformer to the second rotary transformer, a first network of circuit elements having one end thereof connected to one of the windings of said first rotary transformer, the respective values of said circuit elements of said first network being chosen to provide a predetermined transformation ratio between a first A.C. input voltage applied to the other end of said first network and the maximum output voltage derived from the other of said windings of said first rotary transformer, a substantially zero phase shift between said first A.C. input voltage and said output voltage, and an input resistance of a predetermined value at the other end of said first network, when a load resistance of said predetermined value is connected to the other of said windings of said first rotary transformer, and a second network of circuit elements having one end thereof connected to the corresponding one of said windings of said compensator, the respective values of said circuit elements of said second network being chosen to provide the same predetermined transformation ratio between a second A.C. input voltage applied to the other end of said second network and the output voltage derived from the other of said windings of said compensator, a substantially zero phase shift betwen said second A.C. input voltage and said output voltage of said compensator, and an input resistance of the same predetermined value at the other end of said second network, when a load resistance of said same predetermined value is connected to the other of said windings of said compensator.

10. A rotary transformer-compensator unit adapted for use in a chain of units, said rotary transformer-compensator unit comprising a first rotary transformer including at least one rotor winding, at least one stator winding, and means for rotating said rotor winding through an angle with respect to said stator winding, said first rotary transformer having given physical characteristics, and a compensator incorporated with the first rotary transformer, said compensator including a rotor winding and a stator winding, said rotor winding of said compensator being permanently oriented relative to said stator winding thereof to provide maximum coupling therebetween, said compensator having the same given physical characteristics as said first rotary transformer, and a second rotary transfomer electrically connected to the first rotary transformer and the compensator, the first rotary transformer and the compensator being adapted to transmit individual electrical signals to the second rotary transformer, the compensator incorporating into the signal transmitted by the first rotary transformer to the second rotary transformer, the transformation ratio and phase shift of the first rotary transformer, as a means of correcting the signal transmitted by the first rotary transformer to the second rotary transformer, a first network of circuit elements having one end thereof connected to one of the windings of said first rotary transformer, the respective values of said circuit elements of said first network being chosen to provide a predetermined transformation ratio between a first A.C. input voltage applied to the other end of said first network and the maximum output voltage derived from the other of said windings of said first rotary transformer, a substantially zero phase shift between said first A.C. input voltage and said output voltage, and an input resistance of a predetermined value at the other end of said first network, when a load resistance of said predetermined value is connected to the other of said windings of said first rotary transformer, and a second network of circuit elements having one end thereof connected to the corresponding one of said windings of said compensator, the respective values of said circuit elements of said second network being chosen to provide the same predetermined transformation ratio between a second A.C. input voltage applied to the other end of said second network and the output voltage derived from the other of said windings of said compensator, a substantially zero phase shift between said second A.C. input voltage and said output voltage of said compensator, and an input resistance of the same predetermined value at the other end of said second network, when a load resistance of said same predetermined value is connected to the other of said windings of said compensator, the circuit elements of said first and second networks, respectively, including a first series resistance and a shunt capacitance, the values of which are chosen to provide substantially zero phase shift, a second series resistance, the value of which is chosen to provide said predetermined transformation ratio, and a shunt resistance, the value of which is chosen to provide said predetermined value of input resistance.

11. A rotary transformer-compensator unit adapted for use in a chain of units, said rotary transformer-compensator unit comprising a first rotary transformer including at least one rotor winding, at least one stator winding, and means for rotating said rotor winding through an angle with respect to said stator winding, said first rotary transformer having given physical characteristics, and a compensator incorporated with the first rotary transformer, said compensator including a rotor winding and a stator winding, said rotor winding of said compensator being permanently oriented relative to said stator winding thereof to provide maximum coupling therebetween, said compensator having the same given physical characteristics as said first rotary transformer, and a second rotary transformer electrically connected to the first rotary transformer and the compensator, the first rotary transformer and the compensator being adapted to transmit individual electrical signals to the second rotary transformer, the compensator incorporating into the signal transmitted by the first rotary transformer to the second rotary transformer, the transformation ratio and phase shift of the first rotary transformer, as a means of correcting the signal transmitted by the first rotary transformer to the second rotary transformer, a first network of circuit elements having one end thereof connected to one of the windings of said first rotary transformer, the respective values of said circuit elements of said first network being chosen ot provide a predetermined transformation ratio between a first A.C. input voltage applied to the other end of said first network and the maximum output voltage derived from the other of said windings of said first rotary transformer, a substantially zero phase shift between said first A.C. input voltage and said output voltage, and an input resistance of a predetermined value at the other end of said first network, when a load resistance of said predetermined value is connected to the other of said windings of said first rotary transformer, and a second network of circuit elements having one end thereof connected to the corresponding one of said windings of said compensator, the respective values of said circuit elements of said second network being chosen to provide the same predetermined transformation ratio between a second A.C. input voltage applied to the other end of said second network and the output voltage derived from the other of said windings of said compensator, a substantially zero phase shift between said second A.C. input voltage and said output voltage of said compensator, and an input resistance of the same predetermined value at the other end of said second network, when a load resistance of said same predetermined value is connected to the other of said windings of said compensator, and including a third network of circuit elements having one end thereof connected to the other one of said windings of said first and second rotary transformers, the respective values of said circuit elements of said third network being chosen to provide the same predetermined transformation ratio between a third A.C. input voltage applied to the other end of said third network and the output voltage derived from the other end of said first network, a substantially zero phase shift between said third A.C. input voltage and the output voltage derived from the other end of said first network, and an input resistance of said same predetermined value at the other end of said third network, when a load resistance of said same predetermined value is connected to the other end of said first network, and a fourth network of circuit elements having one end thereof connected to the other one of said windings of said compensator, the respective values of said circuit elements of said fourth network being chosen to provide the same predetermined transformation ratio between a fourth A.C. input voltage applied to the other end of said fourth network and the output voltage derived from the other end of said second network, a substantially zero phase shift between said fourth A.C. input voltage and the output voltage derived from the other end of said second network, and an input resistance of said same predetermined value connected to the other end of said second network.

References Cited in the file of this patent
UNITED STATES PATENTS

| | | |
|---|---|---|
| 2,225,653 | Monk | Dec. 24, 1940 |
| 2,606,966 | Pawley | Aug. 12, 1952 |
| 2,615,936 | Glass | Oct. 28, 1952 |
| 2,635,224 | Agins et al. | Apr. 14, 1953 |
| 2,680,836 | Schuck | June 8, 1954 |
| 2,740,935 | Statsinger | Apr. 3, 1956 |
| 2,750,545 | Davis | June 12, 1956 |